(12) United States Patent
Chang et al.

(10) Patent No.: US 9,394,912 B2
(45) Date of Patent: Jul. 19, 2016

(54) COMBINED AXLE STRUCTURE OF A STATOR ASSEMBLY FOR A RADIATOR FAN

(71) Applicants: Liang-Sheng Chang, Hsin Chu Hsien (TW); Tien-Chin Wu, Taoyuan County (TW); Sheng-Chi Lei, Hsin Chu Hsien (TW)

(72) Inventors: Liang-Sheng Chang, Hsin Chu Hsien (TW); Tien-Chin Wu, Taoyuan County (TW); Sheng-Chi Lei, Hsin Chu Hsien (TW)

(73) Assignee: FORCECON TECHNOLOGY CO., LTD., Zhubei, Hsinchu County (TW)

( * ) Notice: Subject to any disclaimer, the term of this patent is extended or adjusted under 35 U.S.C. 154(b) by 315 days.

(21) Appl. No.: 14/096,327

(22) Filed: Dec. 4, 2013

(65) Prior Publication Data

US 2014/0093405 A1   Apr. 3, 2014

Related U.S. Application Data

(63) Continuation-in-part of application No. 13/208,634, filed on Aug. 12, 2011, now abandoned.

(51) Int. Cl.
 *F04D 25/06* (2006.01)
 *H02K 1/18* (2006.01)
 *F04D 29/62* (2006.01)

(52) U.S. Cl.
 CPC ............ *F04D 25/062* (2013.01); *F04D 25/064* (2013.01); *F04D 29/626* (2013.01); *H02K 1/18* (2013.01); *H02K 1/187* (2013.01)

(58) Field of Classification Search
 CPC ..... F04D 25/06; F04D 25/062; F04D 25/064; F04D 25/0646; F04D 25/0613; F04D 29/056; F04D 29/626; H02K 1/18; H02K 1/187; H02K 7/14
 See application file for complete search history.

(56) References Cited

U.S. PATENT DOCUMENTS

| 6,400,053 | B1 | 6/2002 | Horng |
| 2004/0191095 | A1 | 9/2004 | Horng et al. |
| 2008/0253888 | A1 | 10/2008 | Hsiao et al. |
| 2009/0010753 | A1* | 1/2009 | Xiang ................... F04D 29/646 415/170.1 |

* cited by examiner

*Primary Examiner* — Patrick Hamo
(74) *Attorney, Agent, or Firm* — Egbert Law Offices, PLLC

(57) ABSTRACT

A combined axle structure of a stator assembly for a radiator fan, the radiator fan having a pedestal, a stator assembly a rotor blade unit and a reverse axle. The combined axle structure includes a cup-like metal bearing block having bottom and annular walls, an axle socket, and a reverse axle having a bottom end and a reverse pin joint end protruded upwards. The pin joint end is used for alignment and assembly of the sleeving set at the hub center of the rotor blade unit. The bottom end of the reverse axle is tightly inserted and located into the axle socket, the bottom of the metal bearing block is tightly embedded and located onto the embedded locator set at the center of the stator assembly face of the pedestal, and the metal bearing block is located onto the insulated frame via the top end of the annular wall.

4 Claims, 6 Drawing Sheets

COMBINED AXLE STRUCTURE OF A STATOR ASSEMBLY FOR A RADIATOR FAN

CROSS-REFERENCE TO RELATED U.S. APPLICATIONS

The present application is a continuation-in-part of U.S. patent application Ser. No. 13/208,634, filed on Aug. 12, 2011, and entitled "Combined Axle Structure of a Stator Assembly for at Radiator Fan", presently pending.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a radiator fan structure, and more particularly to an innovative one which is designed with a combined axle structure of a stator assembly.

2. Description of Related Art Including Information Disclosed Under 37 CFR 1.97 and 37 CFR 1.98.

The axle center of a conventional radiator fan is generally set at one side of the rotor hub, with its typical pattern disclosed in the prior art of a brushless motor in U.S. Pat. No. 6,400,053 B1. Referring to FIG. 6, its structural pattern is characterized in that: a vertical sleeving 71 is incorporated onto the center of a pedestal 70, a coil stator assembly 72 is located on the periphery of the vertical sleeving 71, while a bearing 73 with an axle hole 731 is set into said vertical sleeving 71, allowing for insertion by an axle center 75 of a rotor 74. However, many fitness errors are observed during actual applications, for example, a fitness error between the axle center 75 and the rotor 74, or a fitness error between the rotor 74 and coil stator assembly 72, or a fitness error between the axle center 75 and the axle hole 731 of the bearing 73, or a fitness error between the bearing 73 and vertical sleeving 71. It can thus be understood in fabrication experience that such radiator fan has shortcomings such as bigger noise, due to difficulty in accurate positioning.

For this reason, a reverse radiator fan has been developed in such a manner that the axle of the rotor is reversely mated onto the stator pedestal, realizing accurate perpendicularity between the axle and stator pedestal. Yet, the coil assembly of the stator is generally assembled onto the preformed cylinder of the stator pedestal in a single modular form. After completion of assembly, larger matching error may occur, so the mismatching between the coil assembly and rotor's magnetic ring will lead to unsmooth operation and louder noises.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

The enhanced efficacy of the present invention is as follows:

Based on the unique design of the present invention wherein the "combined axle structure of stator assembly for radiator fan" allows the reverse axle to be assembled onto said metal bearing block, and the metal bearing block and the pedestal are assembled firmly, the metal bearing block and stator assembly of the present invention could be accurately matched by means of injection molding. Meanwhile, the reverse axle and metal bearing block are combined metallically with excellent matching accuracy and concentricity for lower progressive error, such that the reverse axle and stator assembly can be accurately matched. Further, the matching error of the stator assembly and pedestal has no effect on the assembly matching of the stator assembly, axle and rotor blade unit. With this design, the combined structure of the radiator fan permits great improvement in the matching accuracy, guarantees more smooth operation and efficiently reduces noises with better applicability.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
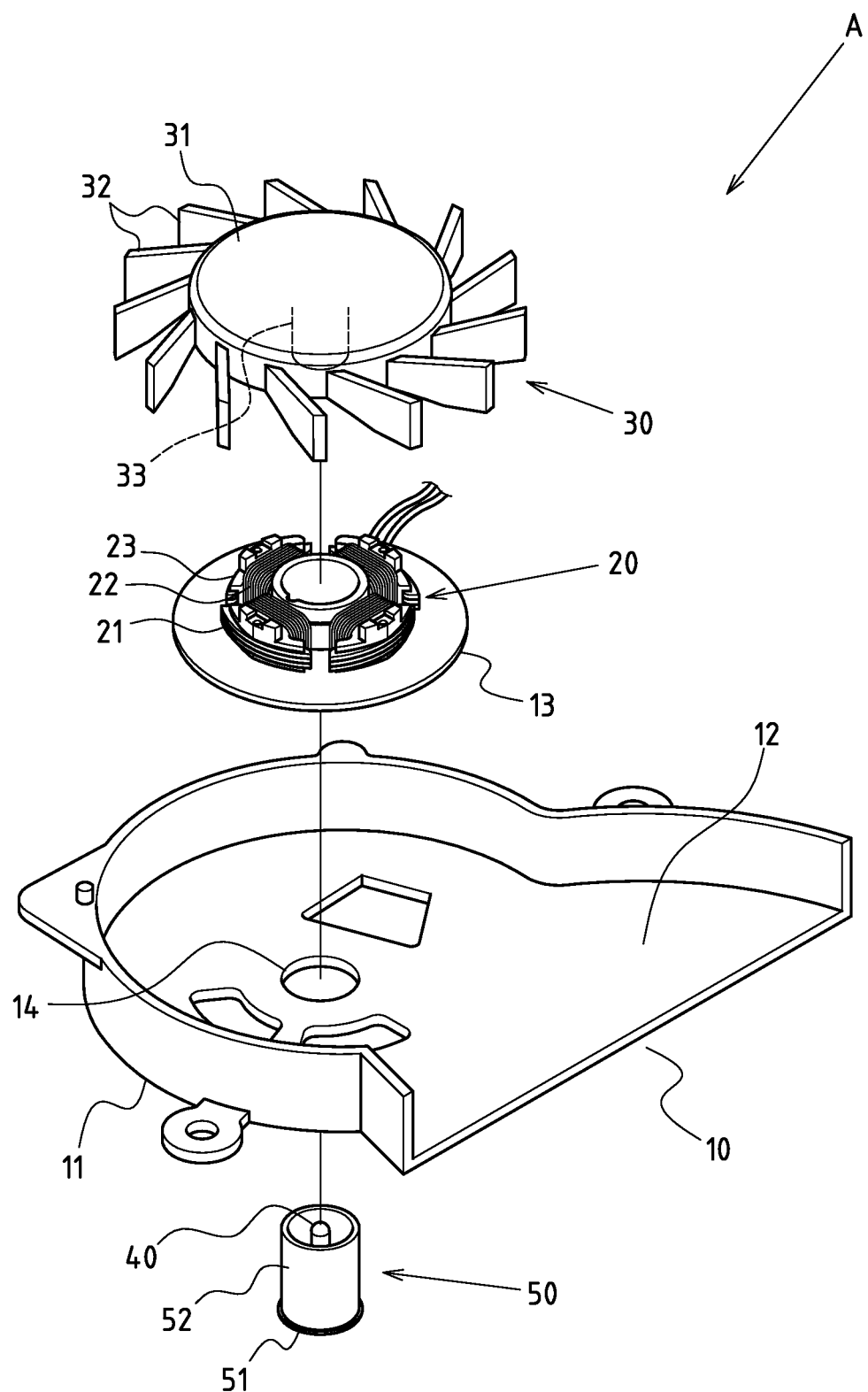
FIG. 1 is an exploded perspective view of the preferred embodiment of the radiator fan of the present invention.
Figure 2:
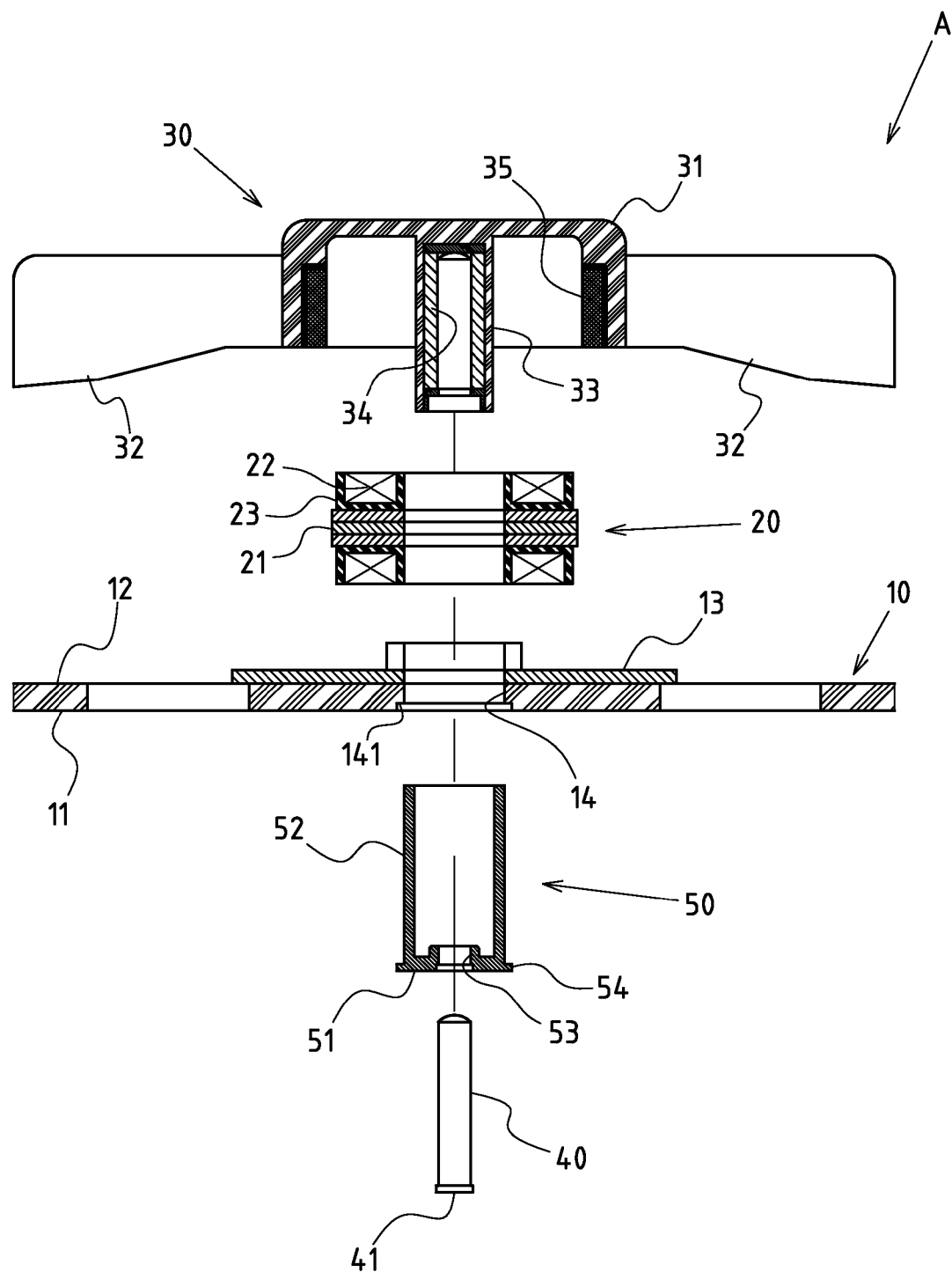
FIG. 2 is an exploded sectional view of the preferred embodiment of the radiator fan of the present invention.

FIGS. 1 and 2, depict preferred embodiments of a combined axle structure of a radiator fan's stator assembly of the present invention, which, however, are provided for only explanatory objective for patent claims.

Said combined axle structure of stator assembly of a radiator fan A comprises a pedestal 10, comprising of a sustaining face 11 and a stator assembly face 12. A circuit board 13 is set onto the stator assembly face 12, and an embedded locator 14 is set on the center of the stator assembly face 12.

A stator assembly 20 is set onto the stator assembly face 12 of the pedestal 10 and comprises of a silicon-steel sheet 21, coil 22 and insulated frame 23.

A rotor blade unit 30 is set on the stator assembly 20 and comprises of a casing hub, fan blades arranged at interval on the periphery of said hub, an axle sleeving protruded downwards to the center of the hub, and a magnetic ring set on the inner annular wall of said hub.

A metal bearing block 50, designed into a cup-like pattern, comprises of a bottom wall 51 and an annular wall 52.

An axle socket 53 is set at the center of the bottom wall 51 of said metal bearing block 50.

A reverse axle 40 is provided and comprises of a bottom end 41 and a reverse pin joint end protruded upwards. Of which, the pin joint end is used for alignment and assembly of the sleeving set at the hub center of the rotor blade unit 30.

Of which, the bottom end 41 of the reverse axle 40 is tightly inserted and located into the axle socket 53 at the center of the bottom wall 51 of the metal bearing block 50.

Of which, the bottom f the metal bearing block 50 is tightly embedded and located onto the embedded locator 14 set at the center of the stator assembly face 12 of the pedestal 10.

Of which, the metal bearing block 50 is located onto the insulated frame 23 via the top end of the annular wall 52.

With this design, since the reverse axle 40 and metal bearing block 50 are combined metallically with excellent matching accuracy and concentricity for lower progressive error, the reverse axle 40 and stator assembly 20 can be accurately matched. The matching error of the stator assembly 20 and pedestal 10 has no effect on the assembly matching of the stator assembly 20, reverse axle 40 and rotor blade unit 30.

Figure 3:
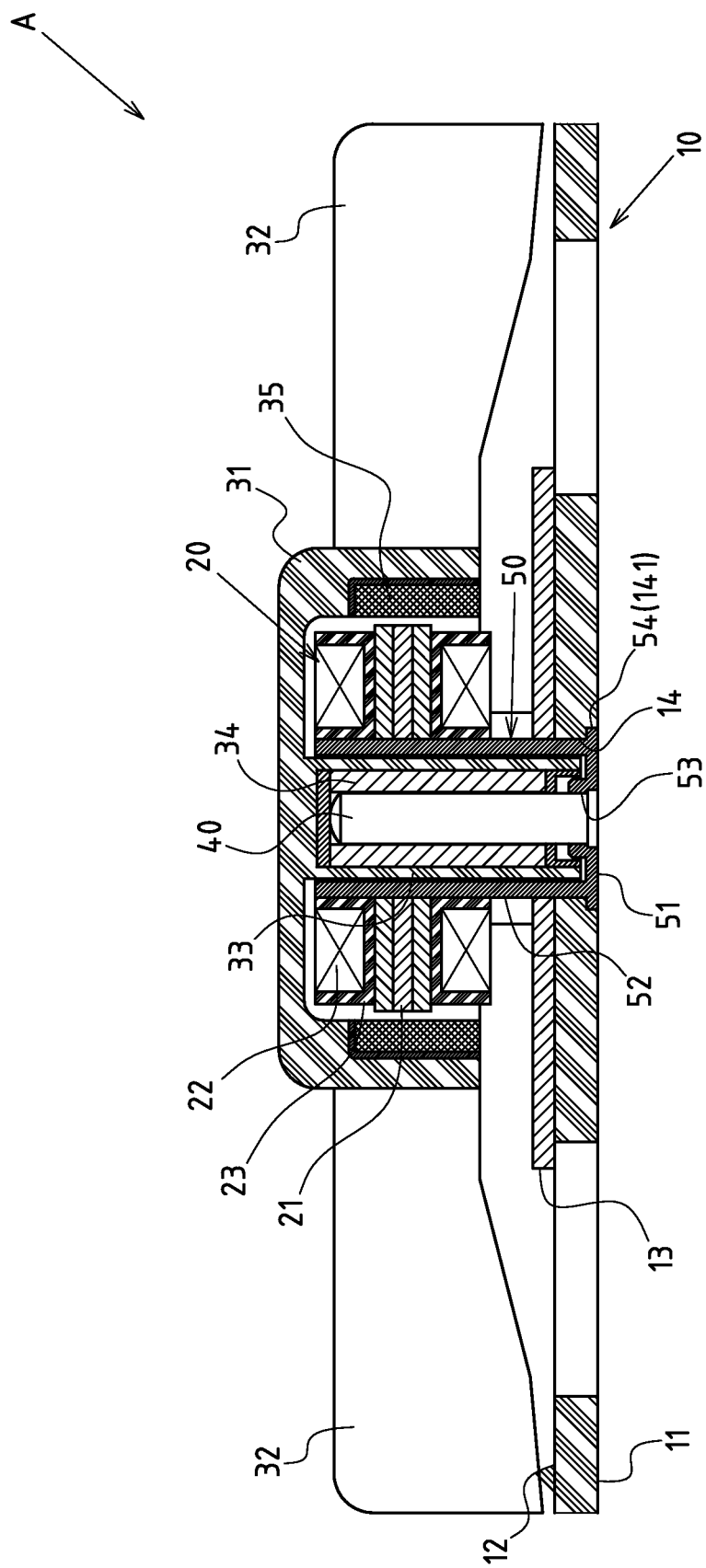
FIG. 3 is an assembled sectional view of the preferred embodiment of the radiator fan of the present invention.

Of which, the embedded locator 14 for the pedestal 10 can be designed into through-hole or grooved pattern. Referring to FIGS. 2 and 3, when the embedded locator 14 is designed into through-hole, an annular flange 54 is protruded on the bottom of the metal bearing block 50, such that an expanded ring slot 141 is set correspondingly at the bottom of the through-hole embedded locator 14, allowing for abutting and embedding of the annular flange 54. Of which, the annular flange 54 at bottom of the metal bearing block 50 and the embedded locator 14 can be fixed by adhesive. Moreover, the peripheral surface at bottom of the metal bearing block 50 can be designed into a rough surface correspondingly to the embedded locator 14, thus increasing the inserting fixation.

Figure 4:
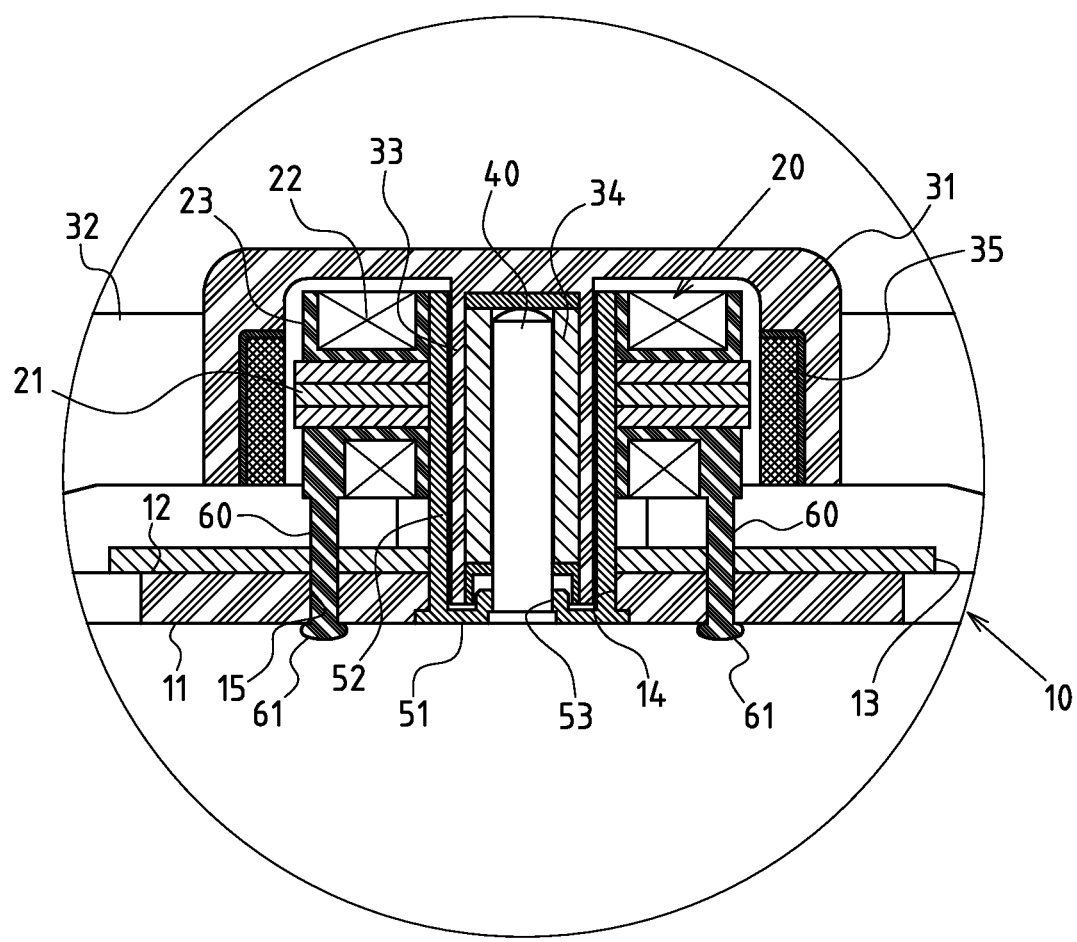
FIG. 4 is an assembled sectional view of another preferred embodiment of the present invention.

Referring to FIG. 4, a locating column 60 is formed onto the insulated frame 23 of the stator assembly 20 and protruded towards the pedestal 10, such that a through-hole 15 is set correspondingly to the pedestal 10 for penetration of the locating column 60. A hot-melt expanded end 61 is formed onto the locating column 60 for abutting onto the sustaining face 11 of the pedestal 10, so that the stator assembly 20 and pedestal 10 can be assembled more stably.

Furthermore, the structure of said rotor blade unit 30 is not improved in the present invention, but represented by typical units, which comprise: a hub 31, several blades 32, an axle bush 33, a bearing 34 and a magnetic ring 35 as shown in FIGS. 1, 2. Of which, said blades 32 are protruded at interval onto the periphery of the hub 31, the axle bush 33 is set into the center of the hub 31, the bearing 34 is assembled into the axle bush 33 for insertion of the reverse axle 40, and the magnetic ring 35 is set annularly onto the circumferential wall of the hub 31.

Based upon above-specified structural design, when the stator assembly 20 of the radiator fan A of the present invention is fabricated, the silicon-steel sheet 21, axle 40 and metal bearing block 50 can be located into an injection molding template, enabling injection coating of the insulated frame 23. With this design, the reverse axle 40 is inserted into the axle socket 53 set at the center of the bottom wall 51 of the metal bearing block 50, such that the reverse axle 40 is accurately located onto the center of the stator assembly 20, thus forming a stator assembly 20 of high accuracy. Next, the stator assembly 20 can be accurately assembled onto the pedestal 10 based on the embedded matching of the metal bearing block 50 and the embedded locator 14 set at the center of the stator assembly face 12 of the pedestal 10.

Figure 5:
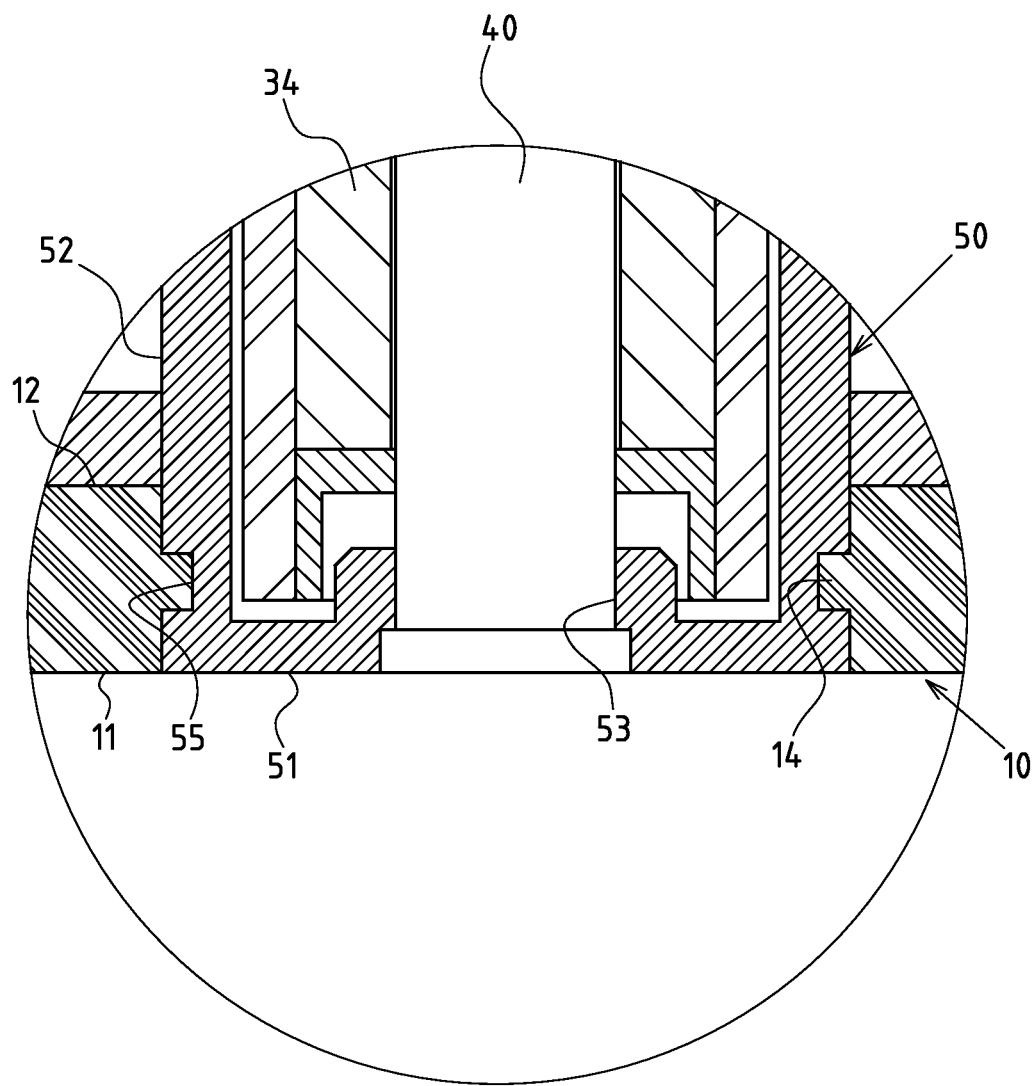
FIG. 5 is an assembled sectional view of another preferred embodiment of the present invention.
Figure 6:
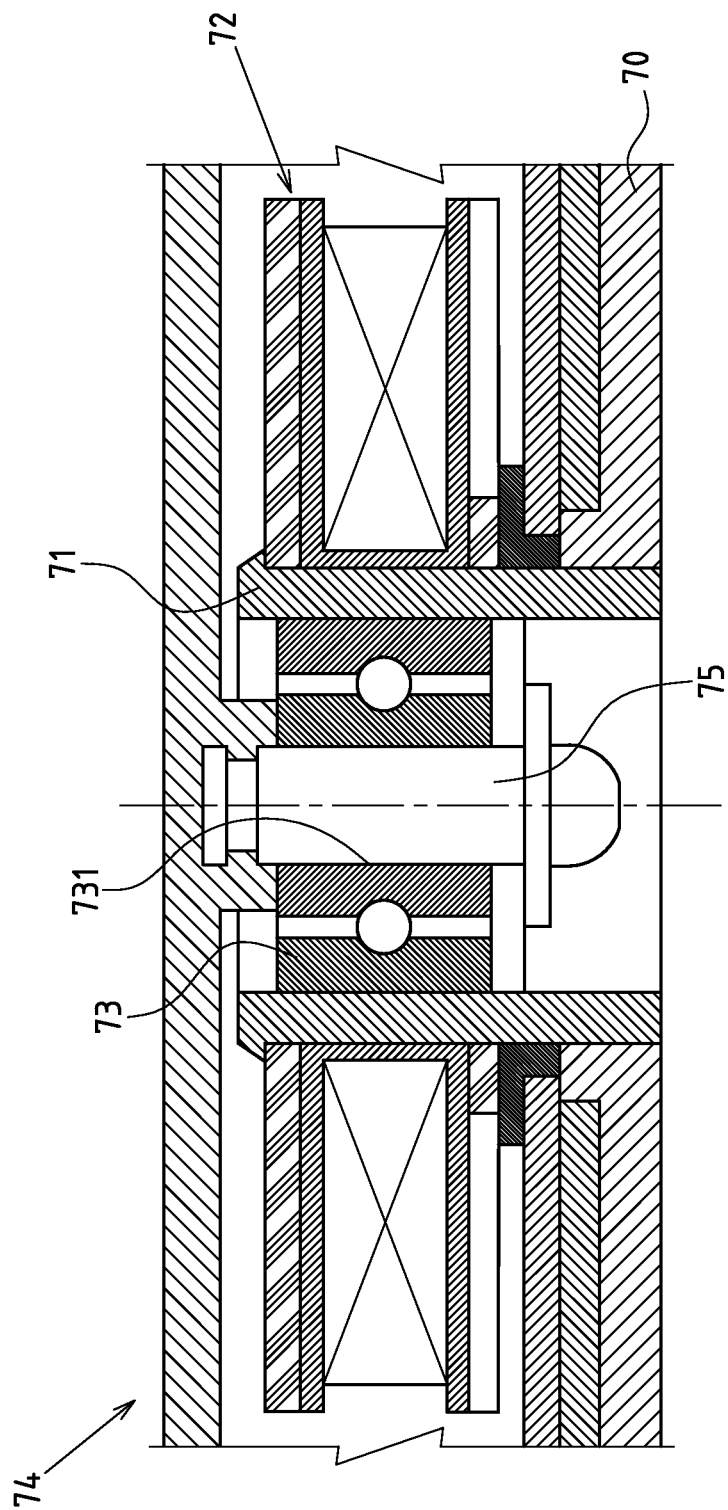
FIG. 6 is an assembled partial sectional view of a conventional structure.

Referring also to FIG. 5, a ring groove 55 or spacing groove is set at bottom of the metal bearing block 50, such that the pedestal 10 made of plastics can be firmly mated with the ring groove 55 or spacing groove at bottom of the metal bearing block 50 by means of injection coating.

We claim:

1. A radiator fan assembly comprising:
a pedestal having a sustaining face and a stator assembly face, said stator assembly face having an embedded locator positioned in a center thereof, said sustaining face having an annular notch formed therein;
a circuit board positioned onto said stator assembly face;
a stator assembly positioned on said stator assembly face, said stator assembly having a silicon-steel sheet and a coil and an insulated frame;
a rotor blade unit positioned on said stator assembly, said rotor blade unit having a casing hub having fan blades arranged at intervals at a periphery of said hub, said rotor blade unit having an axle sleeving protruding downwardly at a center of said hub, and said rotor blade unit having a magnetic ring on an inner annular wall of said hub;
a metal bearing block having a cup shape, said metal bearing block having a bottom wall with an annular flange, said bottom wall having an axle socket formed therethrough and an inset area extending around said axle socket at said bottom wall, said annular flange positioned in said annular notch of said sustaining face; and
a reverse axle having a bottom end with an outer periphery and a pin extending in transverse relation to said bottom end, said outer periphery of said bottom end received in said inset area of said axle socket, said pin received in said axle sleeve of said rotor blade unit, said annular wall of said metal bearing block being positioned onto said insulated frame of said stator assembly.

2. The radiator fan assembly of claim 1, wherein said annular flange of said embedded locator being adhesively affixed in said annular notch of said sustaining face.

3. The radiator fan assembly of claim 1, said annular flange of said metal bearing block having a roughened surface facing said embedded locator.

4. The radiator fan assembly of claim 1, said pedestal being formed of a plastic material, said pedestal being injection-molded around said metal bearing block.

* * * * *